United States Patent [19]

Cope et al.

[11] Patent Number: 4,687,065

[45] Date of Patent: Aug. 18, 1987

[54] SOIL-INVERSION CULTIVATOR

[75] Inventors: Richard E. Cope, Bedford; Hugh G. Stirling, London, both of England

[73] Assignee: National Research Development Corporation, London, England

[21] Appl. No.: 682,254

[22] Filed: Dec. 17, 1984

[51] Int. Cl.[4] .......................... A01B 5/04; A01B 15/16
[52] U.S. Cl. ..................................... 172/167; 172/149; 172/168; 172/175; 172/202; 172/558
[58] Field of Search ............... 172/145, 146, 149, 174, 172/175, 182, 192, 195, 196, 200, 201, 202, 547, 558, 574, 603, 684, 684.5, 686, 688, 566, 168, 167, 714–716, 759, 33, 63

[56] References Cited

U.S. PATENT DOCUMENTS

| 229,455 | 6/1880 | Percefull | 172/736 X |
|---|---|---|---|
| 478,500 | 7/1892 | Clark | 172/168 |
| 596,390 | 12/1897 | Wolcott | 172/175 |
| 606,412 | 6/1898 | Heylman | 172/175 |
| 657,653 | 9/1900 | Fowler | 172/167 |
| 731,179 | 6/1903 | Harrison et al. | 172/33 |
| 789,528 | 5/1905 | Cook et al. | 172/558 X |
| 836,544 | 11/1906 | Upton | 172/168 X |
| 1,094,504 | 4/1914 | Whipple | 172/175 X |
| 1,503,874 | 8/1924 | Block | 172/33 |
| 1,733,181 | 10/1929 | Brown et al. | 172/168 |
| 1,750,887 | 3/1930 | Hall | 172/558 X |
| 2,335,156 | 11/1943 | McMahon | 172/574 X |
| 2,489,385 | 11/1949 | Paul | 172/558 X |
| 2,771,044 | 11/1956 | Putifer | 172/558 X |
| 2,790,369 | 4/1957 | Yetter | 172/168 |
| 2,907,396 | 10/1959 | Gardner | 172/574 X |
| 2,980,191 | 4/1961 | Sassmann | 172/759 X |
| 3,045,765 | 7/1962 | Cox et al. | 172/566 X |
| 3,101,789 | 8/1963 | Jennings | 172/603 X |
| 4,243,104 | 1/1981 | Sipos et al. | 172/149 X |

FOREIGN PATENT DOCUMENTS

| 0047852 | 3/1982 | European Pat. Off. . | |
|---|---|---|---|
| 254630 | 12/1912 | Fed. Rep. of Germany | 172/196 |
| 80/00396 | 3/1980 | PCT Int'l Appl. . | |
| 125377 | 9/1919 | United Kingdom . | |
| 669817 | 4/1952 | United Kingdom . | |
| 727971 | 4/1955 | United Kingdom . | |
| 922353 | 3/1963 | United Kingdom . | |
| 928420 | 6/1963 | United Kingdom . | |
| 163450 | 6/1964 | U.S.S.R. | 172/174 |
| 211906 | 5/1968 | U.S.S.R. | 172/174 |

OTHER PUBLICATIONS

International ®, "Offset Disk Harrows", sales literature (Part No. AD-31438-L4), 3/1982, International Harvester Co., p. 9.

Primary Examiner—Richard J. Johnson
Assistant Examiner—Terrence L. B. Brown
Attorney, Agent, or Firm—Oblon, Fisher, Spivak, McClelland, & Maier

[57] ABSTRACT

A cultivator comprises an array of laterally-spaced soil-inversion discs having their centers arranged in a substantially horizontal line lying at not more than 30° to a transverse plane of the cultivator and being mounted for rotation about individual axes which are equally inclined to the vertical and, when viewed in plan, also to the longitudinal plane of the cultivator.

15 Claims, 15 Drawing Figures

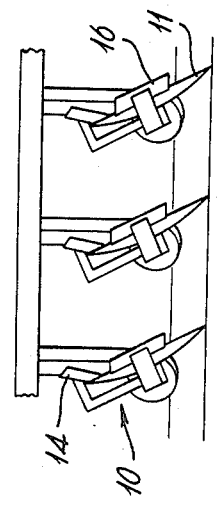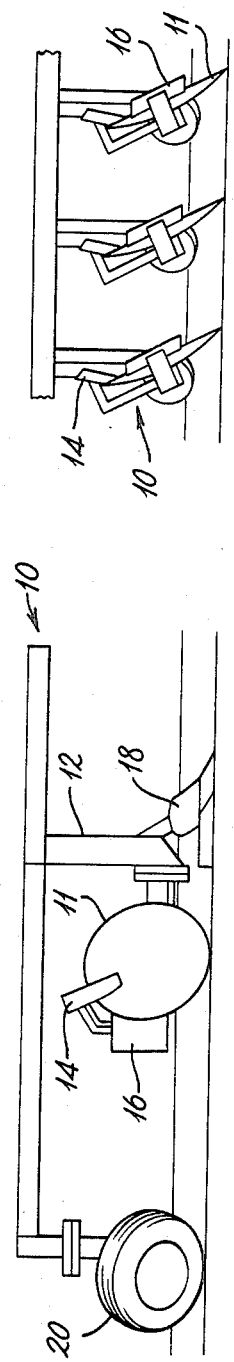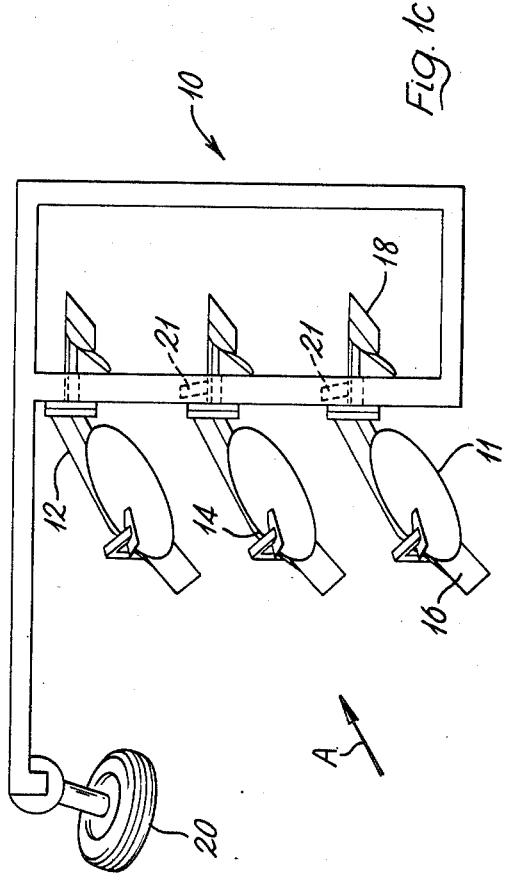

SOIL-INVERSION CULTIVATOR

FIELD OF THE INVENTION

The present invention relates to soil-inversion cultivators for mixing-in and inverting surface straw or other crop-residue to control weeds and to prepare an acceptable surface for subsequent drilling.

DISCUSSION OF THE BACKGROUND

Known devices of this kind are not capable of providing sufficient mixing and burial of crop-residue. This means that the crop-residue is incompletely covered giving less than ideal conditions for the subsequent drilling operation and not providing sufficient weed control.

The effectiveness of these so-called minimum tillage cultivators can be improved by first baling the crop-residue or burning it but baling is not always justifiable commercially and burning is becoming increasingly unacceptable for environmental reasons.

SUMMARY

It is an object of the present invention to provide a soil-inversion cultivator in which these disadvantages are avoided or at least significantly reduced.

According to the present invention, such a cultivator comprises an array of laterally-spaced soil-inversion discs having their centres arranged in a substantially horizontal line lying at not more than 30° C. to a transverse plane of the cultivator and being mounted for rotation about individual axes which are equally inclined to the vertical and, when viewed in plan, also to the longitudinal plane of the cultivator.

The longitudinal plane or mid-plane of the cultivator is defined as being the vertical plane along the centre line of the cultivator in the direction of travel of the cultivator and the transverse plane of the cultivator is defined as being one of the vertical planes lying at right angles to the longitudinal plane of the cultivator.

Conveniently, the horizontal line referred to above lies at not more than 20° C. to the transverse plane of the cultivator and preferably lies either substantially in or parallel to or at not more than 5° C. to said transverse plane.

Optionally, each soil-inversion disc is provided with a mouldboard-shaped scraper or other auxiliary soil-inversion assembly to continue the soil-inversion process being carried out by the soil-inversion discs.

One example of an alternative soil-inversion assembly to the mouldboard-shaped scraper is a slightly curved or substantially flat scraper having its disc-engaging edge shaped to fit the concavity of the disc and followed by a deflector or deflector portion.

The orientation of the slightly curved or substantially flat scraper elements is preferably such that if a cross-section of any particular scraper element is taken in a vertical plane at right angles to the mid-plane of the cultivator, then the inclination of that cross-section to a vertical line in the same vertical plane will lie at between 20° C. and 25° C.

Conveniently, the rear edge of the scraper plate is contained within or lies close to a vertical plane lying parallel to the mid-plane of the cultivator.

Conveniently, where a deflector is provided, this takes the form of a slighty curved or flat plate having a leading edge lying closely adjacent to, and of a concave shape such as to match the curvature of, the circular disc rim. The orientation of the deflector is preferably such that the plane of the plate lies substantially tangentially to the plane of the adjacent border region of the disc.

The advantages in having soil-working implements reversible are well known and have been a feature of conventional mouldboard ploughs for many years. They allow a farmer to plough to and fro across a field, changing the direction of "set" of the soil from the mouldboard at each headland, thereby allowing all the furrows to lie in the same direction. Whereas this furrow pattern is not so critical with a medium (6" working depth) cultivator as it is with a conventional deeper draught plough, it is still desirable.

One way to achieve the desired furrow pattern with an irreversible in-line cultivator according to the present invention would be to plough the field in a circular manner, starting at the outer circumference and working towards the middle. Another way would be to plough the field in lands. Neither method is entirely satisfactory, however, with fields of irregular shape.

Thus according to a preferred feature of the invention, the cultivator is made reversible by having two sets of soil-inversion discs, one of one hand for use when the cultivator is on its outgoing runs and the other of the opposite hand for use when the cultivator is moving in the opposite direction along its return runs, thereby allowing a to and fro motion of the machine across the field without any adverse effect on the furrows formed.

Alternatively, the soil-inversion discs may comprise a single set of discs supported from pivotal support assemblies which allow the set of the discs to be reversed during the return runs of the cultivator across the land to be cultivated.

Conveniently, in this latter case, the auxiliary soil-inversion assembly for each soil-inversion disc is one of two such assemblies mounted one on one side and one on the other side of the disc axis whereby, in use of the cultivator, one of the assemblies will be operative to remove and invert soil from the disc during outgoing runs of the cultivator and the other assembly will be operative to remove and invert soil from the disc during the return runs.

Conveniently, the single-set reversible cultivator referred to above includes control means adapted to arrange the reversal of all the soil-inversion discs simultaneously.

In one such embodiment, for example, the control means comprises a piston-actuated control shaft having abutment members in sliding engagement with pivot-control arms for the soil-inversion discs. In alternative embodiments, the control means comprises a rack and pinion or chain drive.

Conveniently, the soil-inversion discs are dished discs supported either all from their convex sides or all from their concave sides e.g. by appropriate stub axles and hubs.

Conveniently, the orientation of the soil-inversion discs is such that the rotation axis of each disc is inclined at between 15° C. and 30° C. to the horizontal in a vertical plane inclined at between 40° C. and 70° C. to the mid-plane of the cultivator.

Currently preferred values in the two ranges quoted above are 25° C. or 26° C. for the first inclination and 60° C. for the second inclination.

Ploughs using an array of dished discs are already known in which the soil-working discs are supported from their convex sides by vertical legs. The discs in these cases are invariably staggered to such a degree that the vertical leg supporting any one disc does not interfere with the flow of soil from the soil-lifting concave side of the adjacent disc.

In the cultivator of the present invention, the problem of providing for adequate soil-flow between non-staggered or only slightly-staggered discs may conveniently be overcome in one of two ways.

Thus according to a first optional feature of the invention, the soil-working discs of the cultivator are supported from their concave sides so that the disc support for any one disc is remote from and therefore cannot interfere with the flow of soil from the soil-lifting concave side of the adjacent disc.

According to the second optional feature which constitutes an addition or alternative to the first feature, the disc supports are so shaped as to produce a significantly lower resistance to soil moving past the supports.

It may be desirable in the first of these options to have the soil-inversion discs of slightly larger diameter than in the second case so as to lift the disc support to a height where it will be less likely to interfere with soil flow between the discs.

In one example of the second option, the soil-inversion discs are supported, preferably from their convex sides, by rearwardly facing L-shaped support members having only the feet of the L-shapes within the soil region operated on by the discs.

Conveniently, when viewed in plan, the foot of each L-shape will lie parallel to or roughly parallel to the diameter of the associated disc when so viewed.

Conveniently, when viewed from the side of the cultivator, the foot of each L-shape will incline downwardly from the bottom of the upright of the L-shape towards the centre of the associated disc.

Conveniently, when auxiliary soil-working elements are provided upstream of the soil-inversion discs, the elements are secured to or otherwise supported from the upright portions of the L-shaped support members.

Optionally, the array of soil-inversion discs is preceded and/or followed by an array of auxiliary soil-working implements e.g. by an array of laterally-spaced harrow discs, and/or by an array of laterally-spaced fixed or flexible tines, and/or by an array of laterally-spaced plough-like bodies.

Conveniently, in some cases where the array of auxiliary soil-working implements leads the array of soil-inversion discs, these auxiliary elements can themselves contribute towards the soil-inversion process.

Conveniently, in such cases, said auxiliary soil-working elements are offset relative to the soil-inversion discs so as to encourage a full-width treatment of the soil by the cultivator.

Conveniently, in this latter case, said auxiliary soil-working implements carry horizontal or predominantly horizontal soil-cutting blades so as further to encourage a full-width treatment of the soil in soil conditions where the remaining parts of the auxiliary implements might not be fully effective for this purpose by themselves.

Optionally, the auxiliary soil-working implements e.g. the harrow discs, and/or the fixed or flexible tines, and/or the plough-like bodies can be supported from the same main frame as the soil-inversion discs or they can be mounted on one or more separate units e.g. on the front of the towing-tractor, and/or as a bridge link system between the tractor and the cultivator, and/or underneath the belly of the tractor.

Conveniently, the auxiliary soil-working implements e.g. one array of harrow discs fixed or flexible tines, or plough-like bodies extends along a substantially horizontal line particular to that array and lying at not more than 30° C. to the transverse plane of the cultivator.

Conveniently, the horizontal line referred to above lies at not more than 20° C. to the transverse plane of the cultivator and preferably lies either substantially in or parallel to or at not more than 5° C. to said transverse plane.

The harrow discs, when present, conveniently comprise flat or wavy-edged discs. However, in an alternative arrangement, the harrow discs comprise dished discs mounted for rotation about a common axis inclined at other than a right angle and preferably at more than 30° C. (about 75° C. being a preferred value) to the longitudinal plane of the cultivator and in the opposite sense to the rotation axes of the soil-inversion discs.

In this latter case, the harrow discs may be arranged so as to have their concavities on the same sides as the soil-inversion discs or on the opposite sides.

Conveniently, the fixed or flexible tines, if present, are laterally offset relative to the soil-inversion discs.

Optionally, the array of soil-inversion discs is followed by a crumbler roller e.g. an open helical roller or other soil-engaging component.

Conveniently, the cultivator includes at least one rubber-tired ground support wheel or steel disc flanged ground support wheel rotatable, or each rotatable, about an axis preferably inclined at between 10° C. and 45° C. to the vertical and, when viewed in plan, inclined to the longitudinal plane of the cultivator in the opposite sense to that in which the rotation axes of the soil-inversion discs are inclined to said longitudinal plane.

BRIEF DESCRIPTION OF THE DRAWINGS

Embodiments of the invention will now be described, by way of example only, with reference to the accompanying drawings in which:

FIGS. 1a and 1c are respectively diagrammatic side and plan views of a first embodiment of the invention;

FIG. 1b is a simplified end view looking along arrow A in FIG. 1c;

DESCRIPTION OF THE PREFERRED EMBODIMENTS

Figure 2:
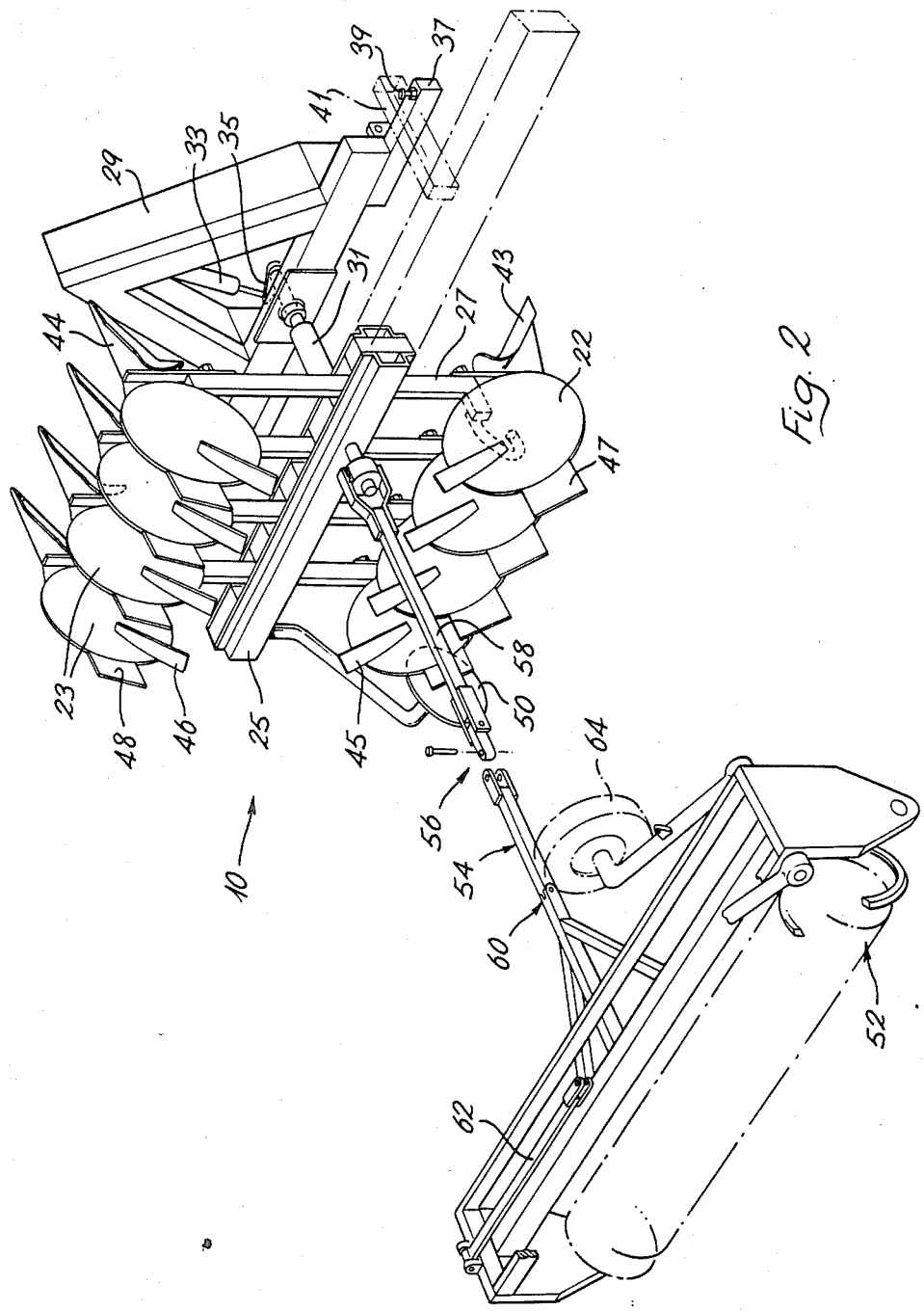
FIG. 2 is a partially diagrammatic simplified perspective view of a second embodiment of the invention.

Thus referring first to FIGS. 1a, 1b and 1c of the drawings, a cultivator 10 according to the present invention comprises a plurality of concave discs 11 of from 559 mm to 900 mm in diameter mounted transversely across the back of the tractor to achieve inversion and burial of crop residue.

The discs 11 may have plain edges or have scalops around the circumference. Alternatively, they may be of the chisel type with a saw tooth edge or they may have teeth bolted on in line with the face of the disc and at any convenient angle to it. The concavity of the discs conveniently ranges from 60 mm to 120 mm. The convex faces of the concave discs are bolted onto hubs which are held between two taper roller bearings to take side forces.

The hub units are bolted into L-shaped support brackets 12 with adjustment at the base of a vertical leg of the bracket 12 so that the disc can conveniently be inclined at from 15° C. to 30° C. to the vertical plane in the direction of travel of the cultivator.

Each vertical leg of the L-shaped bracket is welded to a swivel plate system (not shown) which is in turn clamped onto a hollow section beam. This allows different disc angles to the direction of travel to be obtained and these may conveniently vary from 20° C. to 50° C.

Each disc unit has a flat scraper 14 mounted on the concave surface at the rear of the disc with a side edge shaped to fit the concavity of the disc. The cross-section of the scraper taken in a vertical plane at right angles to the mid-plane of the cultivator is inclined at from, say, 20° C. to 25° C. to a vertical line in that plane and the trailing edge of the scraper is contained within or lies close to a vertical plane lying parallel to the mid-plane of the cultivator.

The scraper is supported by a vertical member at the rear edge of the disc which is welded to the horizontal member carrying the disc bearing housing or supported from the vertical leg of the L-shaped support bracket.

A flat deflector plate 16 which may conveniently be from 300 mm to 400 mm long and from 300 mm to 600 mm high is mounted at the rear of the disc and its front edge is shaped to fit the circumference of the disc and its plane substantially tangential to the plane of the adjacent border region of the disc.

In an alternative design, the deflector plate is extended upwards and forwards towards the scraper in which case it will be curved over towards the adjoining unit.

The scraper/deflector assembly 14, 16 helps to provide better soil inversion and a more level finish especially in lighter soils.

A shallow plough-type body 18 with a share, landslide and mouldboard is mounted in front of the vertical leg of the disc support bracket and protrudes forward for 380 mm, for example. This is bolted to the vertical leg of the bracket 12 so that the tip of the share is say, 600 mm in front of the front edge of the disc.

Each plough-type body 18 is conveniently made up of a leading share of a width of from 140 to 300 mm with an entry angle of 30° C. and raked backwards at 40° C. The share can be fitted with a bar point for increased depth at the tip of the share. In addition, each body 18 is conveniently fitted with a landslide of from 300 mm to 460 mm long and a small mouldboard is bolted to the top of each share to turn the soil over and sideways towards the next unit. The plough body would also incorporate a shaped backward raked blade, protruding out at about 90° C. and away from the back of the landslide which will move the soil not moved by the adjoining disc.

Conveniently, the plough bodies will be designed to be an integral part of the rear disc support leg.

The combination of the shallow plough-type body 18 and an individually-pivoted large diameter disc 11 with scraper/deflector assembly 14, 16 forms a complete mixing and inversion unit. As already indicated, a number of these units are mounted on a hollow section horizontal beam held transversely across the back of the tractor. The number of units varies with the total width of machine required and the spacing conveniently varies from 450 mm to 800 mm depending on the depth of cultivation required. The most likely optimum spacing for depths of cultivation up to 150 mm will be from 700 mm to 760 mm. It would also be possible to mount these units on a beam which is angled away from the transverse plane by between 1° C. and 30° C., say. The cultivator 10 would then be longer but it would still do a good job of cultivation.

In order to maintain sideways stability of the machine, a spring-loaded rubber-tired depth wheel 20 which conveniently has a 460 mm diameter and is angled at from 10° C. to 45° C. to the vertical and at from 0° C. to 30° C. to the longitudinal plane is fitted behind the outside (left-hand side) rear disc unit. It runs in the furrow created by this unit. A disc-type flanged depth wheel can be used instead of the rubber-tired wheel if desired and would run within the same range of angles.

Also there is a possibility that two rubber-tired or disc-type flanged depth wheels could be used, one on the left-hand side of the machine as described above, and the other on the right-hand side at the front so it runs in the last furrow bottom of the preceding run.

Assistance in the control of the sideways forces is achieved by offsetting the machine so that the first plough-type body 18 at the right-hand side of the machine (when viewed from the rear) is positioned in the centre line of the tractor to within plus or minus 20 cm.

Sidewardly extending knives 21 ensure that no part of the soil is left uncultivated even in adverse soil conditions.

In order to consolidate the surface of the soil after inverting it and to break down the soil particles size, a Flexicoil roller (not shown) may be mounted at the rear of the machine which has variable vertical adjustment so that some of the weight of the machine can be transferred onto it. The "Flexicoil" roller consists of one or more horizontal rotors which are made of square bar wound into a spiral of, say, 460 mm diameter. The bar is twisted in such a way that the long corner edges of the bar are presented to the surface of the soil. The cultivator 10 conveniently incorporates a crumbler unit having two or more such rotors side by side which can be mounted so they either move soil to the left or right, or towards the centre or each end of the machine. It would be possible to substitute any other type of crumbler roller or other soil-engaging component depending on type and condition of soil.

Referring now to FIG. 2 of the drawings, this shows a reversible disc cultivator 10 according to the present invention which comprises two sets of soil inversion discs 22, 23 supported from the same transverse beam 25 by L-shaped brackets 27.

The beam 25 is in turn pivotally supported from an A-frame 29 by an axle member 31 secured to the beam about one quarter of the way along the beam length as shown.

At the forward end of the axle member 31, a double-acting ram 33 is attached to a lug 35 protruding sidewardly from member 31 as shown. Starting from the position shown, contraction and subsequent extension of the ram 33 to move the lug 180° C. clockwise (as viewed in the drawing) will be effective to move the beam 25 from the illustrated position to its alternative position (shown in broken lines in the Figure) the momentum of the system being sufficient to move it past the top dead centre position.

Although if desired the ram 33 can be operated at will using the tractor's double spool valve, it is normally preferred to have at least some degree of automation. Thus in a preferred version, the ram is arranged to be completely shut when in its most retracted condition and a pressure valve in the hydraulic circuit to the ram senses this and then automatically reverses the oil flow through the ram to extend it again. Other systems for achieving the same end are known from reversible ploughs and will readily be apparent to those skilled in the art.

As shown in the drawings, the A-frame 29 has a sideways extension 37 carrying an upwardly projecting adjustable stop member 39. This member is engaged by a rearwardly extending arm 41 of the beam 25 when the latter is disposed in the alternative position to that shown. The extension 37 and adjustable stop member 39 are duplicated on the left-hand side of the A-frame to provide support for the beam 25 in the illustrated position.

The purpose of having the stop member adjustable is to ensure that the beam 25 can be kept in a substantially horizontal orientation irrespective of ground conditions etc.

It is also highly desirable that the beam 25 can be locked in each of its two horizontal positions by hydraulically operated pins (not shown) and conveniently the control circuitry for these pins will be linked with that for the double-acting ram 33. Similar hydraulically operated pins can also be used to lock the beam in a vertical position so as to reduce the overall width of the machine to below the permitted maximum when the machine is to be moved from site to site along a public highway.

As before, each soil-inversion disc 22, 23 is associated with a plough-like body 43, 44 a flat scraper 45, 46 and a soil deflection plate 47, 48 all of substantially the same configuration as was described in relation to the first embodiment.

In operation of the cultivator with the beam 25 as shown in FIG. 2, the discs 22, bodies 43, scrapers 45 and deflector plates 47 will operate during each outgoing traverse across the ground to be cultivated by moving the soil in a left to right direction relative to the towing tractor.

For the return traverse, ram 33 will be actuated to swing the beam 25 over to the alternative position shown in broken line in the drawing and this will bring the discs 23, bodies 44, scrapers 46 and deflector plates 48 into operation. Because the discs 23 are of the opposite set to the discs 22 of the first set, they will now operate to move the soil in the right to left direction of the tractor i.e. in the same direction, relative to the ground, as before.

Thus by using first one set of discs and then the other set of discs in this way, the overall cultivation pattern of the soil can be maintained despite the change of direction of the tractor as it traverses the land first in one direction and then in the contrary direction.

The dimensions, shapes and inclinations of the discs, plough-like bodies, scrapers and soil deflection plates have not been discussed in relation to the FIG. 2 embodiment as they can be substantially the same, all things being equal, as in the first embodiment.

The arrangement is completed by a disc-type flanged depth wheel 50 inclined in a similar fashion to the depth wheel 20 of the first embodiment so as to give the machine sideways stability.

Reference numeral 52 indicates a Flexicoil roller e.g. of the same general characteristics as that described with reference to the first embodiment.

In the operational situation shown in FIG. 2, the roller 52 is being pulled along by its tow bar 54 which is connected via a universal joint 56 with the freewheeling extension 58 of the axle member 31.

When the machine and its Flexicoil roller are to be taken along the public highway, the tow bar 54 is disconnected from the extension 58 at the joint 56 and is folded back on itself at the hinge 60 which can be locked rigid when in the operational position by an appropriate locking pin (not shown).

Two road transport wheels are then swung down at one end of the roller to lift that end of the roller of the ground and a second tow bar 62 at the other end of the roller is unfolded and connected with the extension 58 at joint 56.

Reference numeral 64 indicates one of the two ground support wheels referred to above, the other not being shown in the drawing. To hold the wheels in place, a locking pin (not shown) is also provided.

Figure 3:
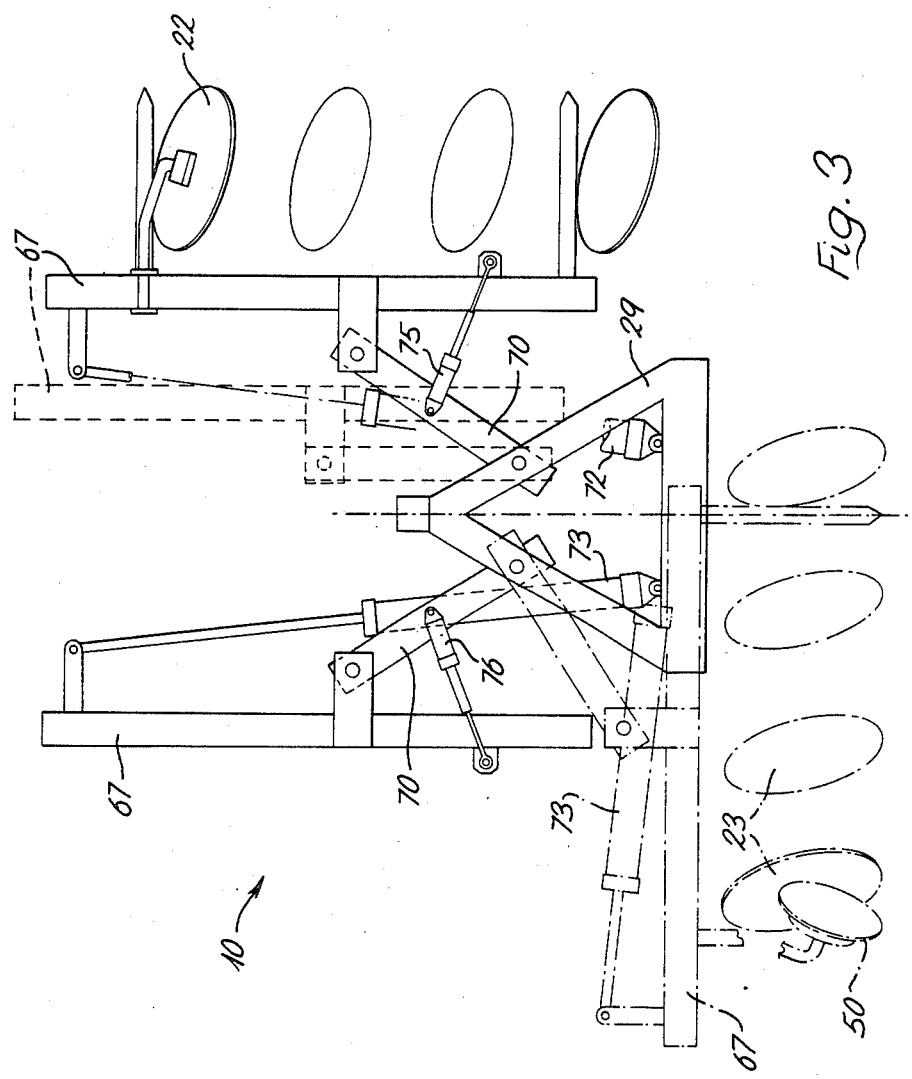
FIG. 3 is a partially diagrammatic simplified end view, looking forwards, of a third embodiment of the invention.

Referring now to FIG. 3 of the drawings, this shows an alternative arrangement to the FIG. 2 embodiment in which the two sets of oppositely-handed soil-inversion discs are supported from separate beams 66, 67, each pivotally secured to a central A-frame 68 by a pivotal linkage 70.

Two two-stage double-acting rams 72, 73 are used to move the beams between their inoperative vertical portions and their operative horizontal positions in which they are supported on appropriate A-beam extensions in exactly the same way as with the FIG. 2 embodiment. Once again, adjustable stop members are preferably provided to ensure that the beams are accurately horizontal irrespective of soil conditions etc.

when the machine is to be moved from one site to another over fields or along private roads or tracks, then it will usually be enough to fully contract both the rams 72, 73 to bring the beams into the illustrated positions.

However to further reduce the effective width of the machine to the point where it complies with the regulations for public highways, it will usually be necessary to actuate a second pair of rams 75, 76 which operate on linkage 70 to pull the beams even closer together e.g. to the point where the pivoted beams of linkage 70 are upright.

As before hydraulically operated pins (not shown) are preferably provided to lock the beams 66, 67 in their various positions and a Flexicoil roller is pulled behind the machine to level out any uneveness caused by the action of the soil-inversion discs.

Figure 4A:
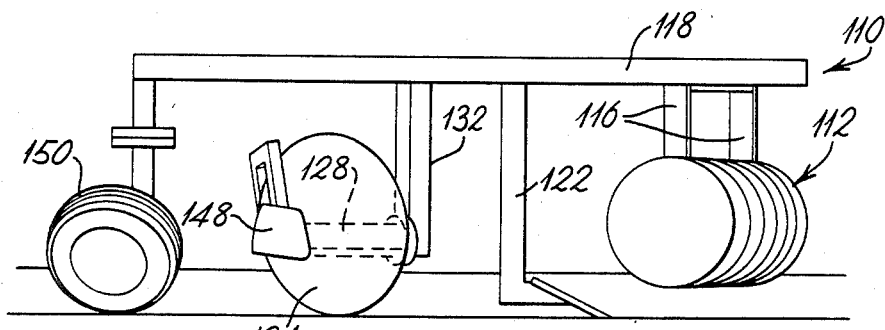
FIGS. 4a, 4b, 4c are respectively diagrammatic side, end and plan views of a second embodiment of the invention.
Figure 4B:
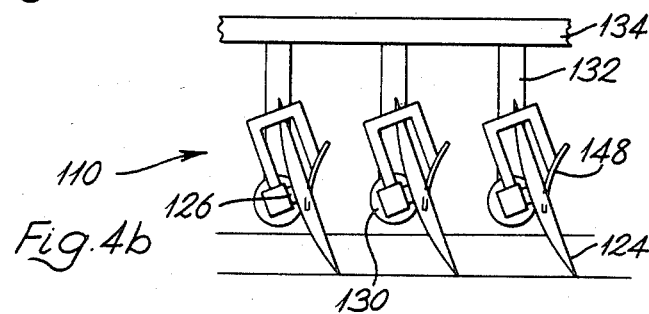
Figure 4C:
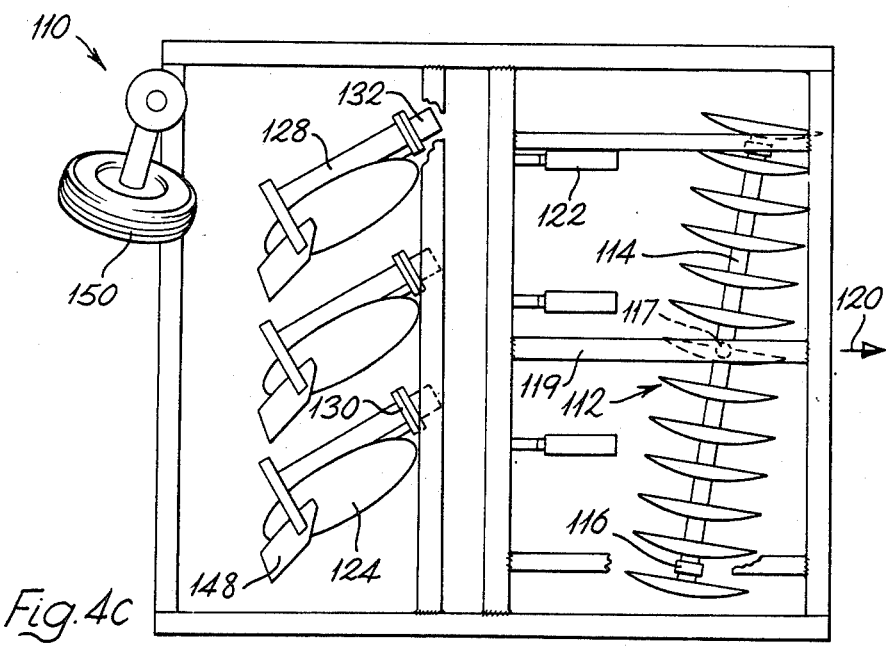

Referring now to FIGS. 4a to 4c, a cultivator 110 according to a second embodiment of the present invention comprises a gang of equally-spaced harrow discs 112 mounted on a common axle 114. The axle is supported by vertical legs 116 attached to a cross-member, omitted from FIG. 4c, and with bearings at their bases. The cross member is supported from a central pivot 117 carried by a frame member 119. Locking devices (not shown), are mounted on the cultivator frame 118 to maintain the axle 114 at an angle of betweem 10° C. and 25° C. to the forwards direction 120 of the cultivator. The discs 112 are dished and typically have diameters of around 500, 560, 760 mm etc.

The harrow discs are followed by fixed chisel tines 122 equally spaced apart along a transverse support beam forming part of the cultivator frame 118.

Towards the rear of the cultivator, the tines 122 are followed by an array of in-line soil-inversion discs 124, the hub units 126 of which are attached via adjustable members 128 and swivel plate systems 130 to their vertical support legs 132 to form an "L" shaped structure. At their upper ends, the legs 132 are secured via swivel plate systems (not shown) to a second cross member 134, the cross member 134 being welded to the cultivator frame 118.

The purpose of members 128 and swivel system 130 is to allow the discs 124 to be inclined at from 15° C. to 30° C. to the vertical, while the swivel systems on cross member 134 allow the discs to be inclined at from 20° C. to 50° C.to the forward direction of the device.

It is worth noting that each hub unit 126 preferably includes a pair of taper roller bearings to resist the side forces which arise in operation of the cultivator.

As will be clear from the drawings, the discs 124 are dished, the concavity of the discs typically ranging from 60 mm to 120 mm for disc diameters of 559 mm and 762 mm respectively but larger disc diameters of up to 1,000 mm may be necessary. The number of these soil-inversion discs will also vary according to the width of machine required. So too will the disc-to-disc spacing which might, for example, be anything from 458 to 800 mm depending on the depth of the cultivation.

Figure 5A:
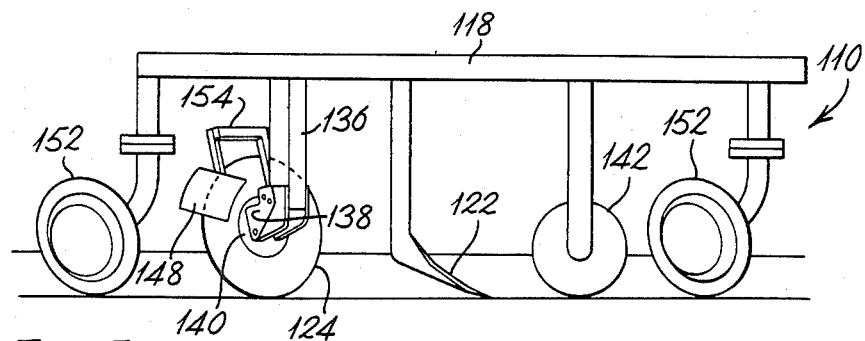
FIGS. 5a, 5b, 5c are respectively diagrammatic side, end and plan views of a third embodiment of the invention.
Figure 5B:
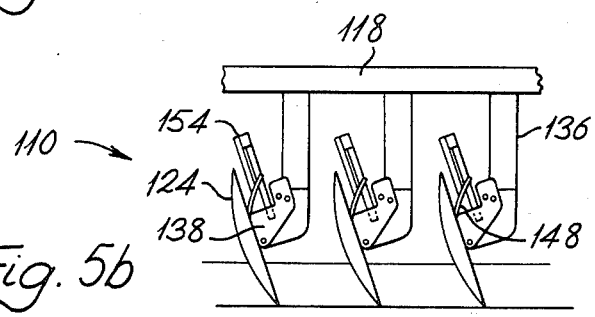
Figure 5C:
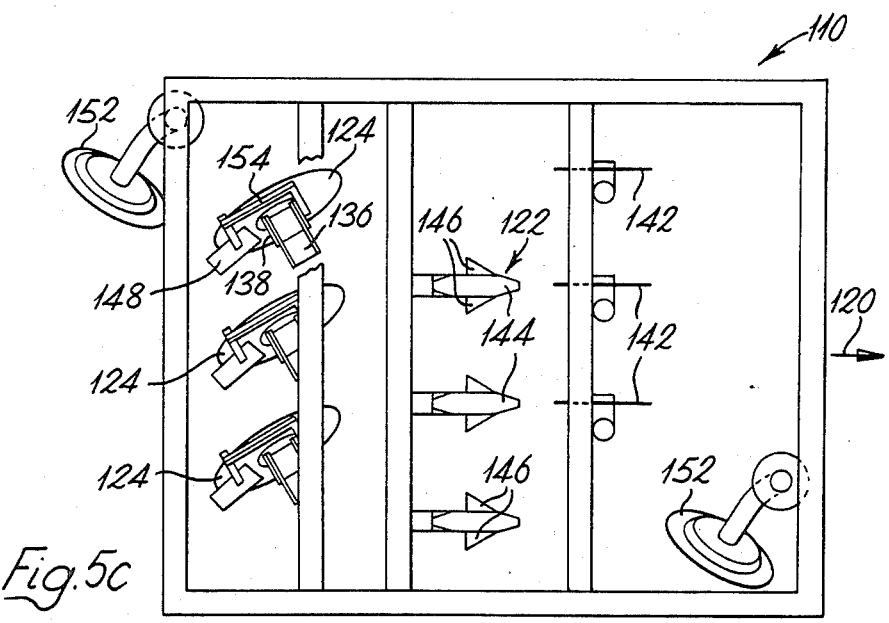

In the embodiment of FIGS. 5a to 5c, the discs 124 are each mounted on an associated vertical leg 136 and adjustable bracket unit 138 to incline the discs 124 by from 15° C. to 30° C. to the vertical plane. However in this case, the soil-inversion discs are supported from their concave sides by an appropriate bearing assembly 140. The advantage of supporting each disc 124 from its concave side is that each disc can then only move the soil onto the clear convex face of the adjacent disc in the assembly.

It would be possible, of course, to modify the embodiment of FIGS. 5a to 5c by mounting the disc with the hub unit 140 on the convex side as described in FIGS. 1a to 4c. Similarly, of course, the embodiment of FIGS. 1a to 1c could, if desired, be modified to have the discs 124 supported from the concave side of the discs.

A second difference is that in the embodiment of FIGS. 5a to 5c, the dished inclined harrow discs 112 of the previous embodiment are replaced by flat or wavy-edged discs 142 aligned with the direction of forward motion of the cultivator. As a result, the shares 144 of tines 122 are fitted with wings 146 with share angles of from 15° C. to 30° C., for example. Once again, however, the harrow and tine systems of the two embodiments are interchangeable.

In both the embodiments of FIGS. 4a to 4c and 5a to 5c, each soil-inversion disc unit has a mouldboard-shaped scraper 148 mounted on the bracket unit 138 by an adjustable connector 154 to remove any soil sticking to the concave surface at the rear of the soil-inversion disc 124 under moist conditions and to complete the inversion process of the soil. The base of each scraper needs to be between 300 and 400 mm from the base of the disc where the diameters range from 559 to 686 mm.

In operation of the cultivators of FIGS. 4a to 4c and 5a to 5c, the harrow discs 112 operate to mix in the surface-lying straw or other crop-residue, the choice of flat, wavy-edged, or dished discs for this purpose depending on the type of incorporation required.

The tines 122, which normally operate at the same depth (100 to 200 mm) as the soil-inversion discs 124, also assist penetration in very hard conditions.

If desired, the tines can penetrate to a depth of 25 to 50 mm deeper than the discs 124 if necessary.

The primary purpose of the soil-inversion discs is to achieve complete burial of the crop residue, preferably so as to leave on top of the buried crop a 15 to 50 mm depth of soil free from crop-residue. In this respect the mouldboard-shaped scrapers 148 have the most important function of completing the process of inversion started by the discs 124.

As illustrated in the drawings, the soil-inversion discs 124 are arranged to move soil to the right as the device progresses in direction 120 and this introduces a degree of instability into the machine. In the version of the device of FIGS. 4a to 4c, this is partly compensated for by having the dished harrow discs move the soil in the opposite direction to the soil-inversions discs. In the version of FIGS. 5a to 5c, this stability is achieved instead by having the flat or wavy-edged harrow discs aligned with direction 120 to impart some longitudinal stability to the machine.

Although in both cases the tines 122 also contribute to the stability of the machine, complete stability can usually only be achieved by means of rubber-tired wheels 150 (FIGS. 4a to 4c) or angled flanged steel wheels 152 (FIGS. 5a to 5c) which are angled to the vertical plane to engage the appropriate furrow walls on each side of the device to take out the remaining side forces. These wheels will also be inclined to the forwards direction 120 of the cultivator but in the opposite sense to the soil-inversion discs 124.

Referring now to FIGS. 6a to 6d of the drawings, a reversible disc set cultivator 210 according to the present invention comprises an array of flat or wavy-edged harrow discs 242 mounted on a cross-beam of the cultivator frame 218 and aligned with the direction of forward motion 220 of the cultivator.

The harrow discs 242 are followed by chisel tines 222 fixed to a second cross-beam of the cultivator frame 218 and fitted with winged shares 244.

Towards the rear of the cultivator, the tines 222 are followed by an array of soil-inversion discs supported from their concave sides by appropriate bearing assemblies 240. Each of these latter is, in turn, supported from an associated support leg 236 by an adjustable bracket unit 238 enabling the inclination of the discs 224 to the vertical to be varied.

Figure 6A:
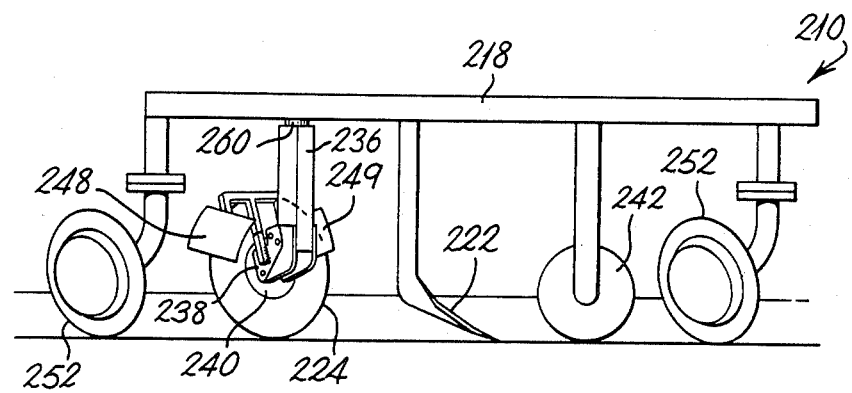
FIGS. 6a, 6b, 6c are respectively diagrammatic side, end and plan views of a fourth embodiment of the present invention.
Figure 6B:
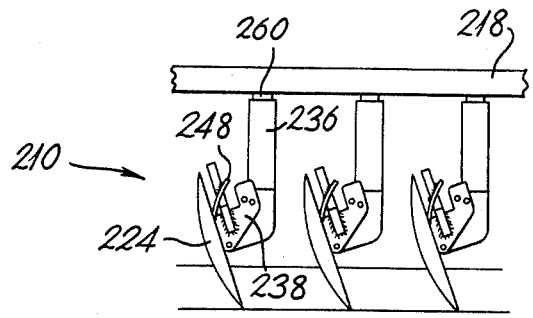
Figure 6C:
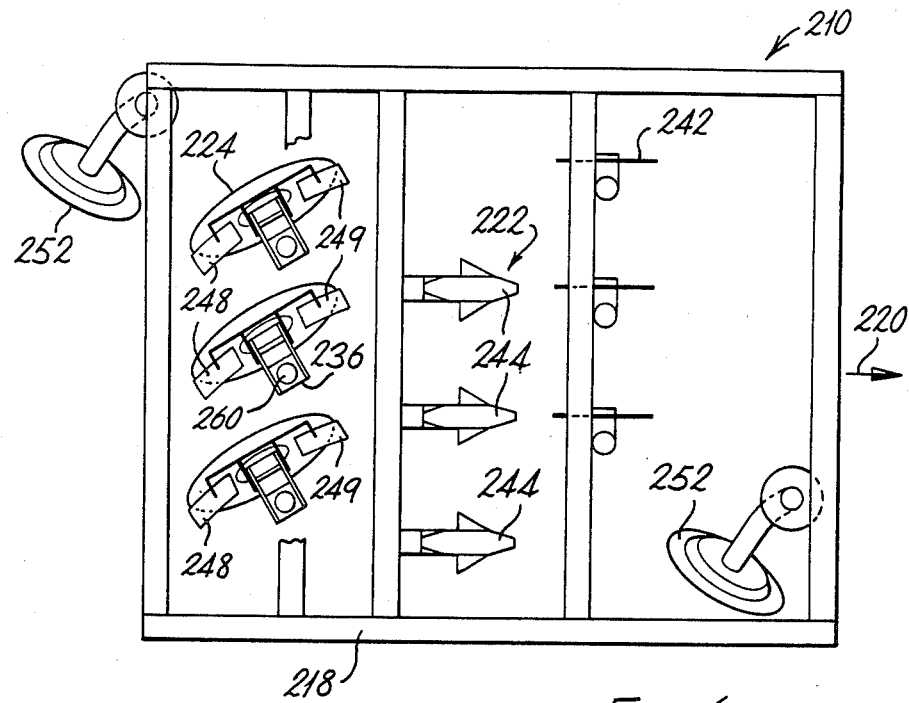
Figure 6D:
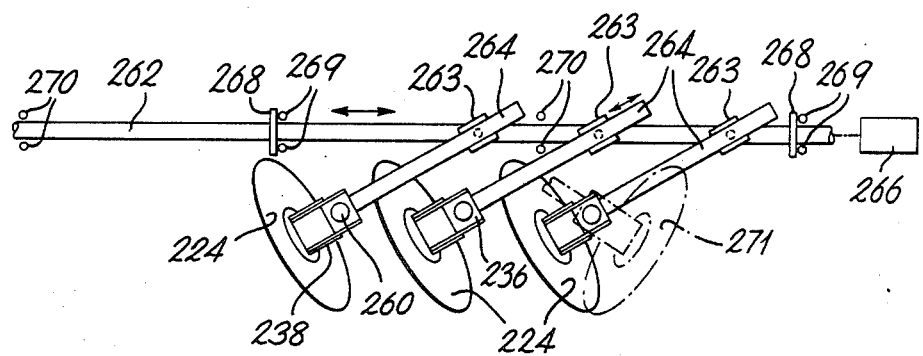
FIG. 6d is a diagrammatic scrap view of part of the embodiment of FIGS. 6a to 6c.

The support legs 236 for the soil-inversion discs 224 are rotatably attached to the harvester frame 218 by swivel plates 260 and in order that the discs 224 should always subtend the same angle to frame 218 and hence to the direction of forwards travel 220, the discs are interconnected by a rigid link rod 262 (shown only in FIG. 6d). This latter carries pivoted guide shoes 263 for sliding engagement by extension arms 264 of the legs 236.

A hydraulic piston 266, operable from the cab of the towing tractor, acts to displace rod 262 longitudinally whenever the set of discs 224 is to be reversed at the end of a run.

In the situation shown in FIG. 6d, the rod 262 is at one extreme of its travel with abutment plates 268 on the rod 262 engaging with fixed stops 269 and the discs 224 at their first positions. Other stops 270 define the other extreme of rod travel needed to move the soil inversion discs to their second positions (indicated by broken lines 271 in FIG. 6d for the endmost soil-inversion disc 224).

In practice, the positions of stops 269, 270 may be preset by the operator before commencing ploughing to determine the arc through which the discs 224 will rotate when activated by the hydraulic ram 266.

Conveniently, for example, there will be four such stop settings to cover disc angles of 20° C. to 50° C. (in 10° C. increments) to the forward direction of travel 220. To reverse the direction of the disc for a 20° C. setting, the arc of swing will be 140° C.; for 30° C., the arc will be 120° C.; for 40° C., the arc will be 100° C.; and for 50° C., the arc will be 80° C.

The soil-inversion assembly is completed by mouldboard-shaped scrapers 248, 249 (omitted in FIG. 6d) attached one on one side and one on the other side of the associated bracket unit 238. The scrapers are adjustable to enable the clearance between the scrapers and the discs to be varied at will.

In the situation shown in FIG. 6c, only the scrapers 248 will be in operation whilst the disc is rotating, the scrapers 249 being inactive until the set of the discs is reversed for the return run of the cultivator. When this happens, the scrapers 249 now become operational (as the rear scrapers), while scrapers 248 are inactive (as the front scrapers).

Angled flanged steel wheels 252 (or rubber tires) engage the furrow walls on either side of the cultivator to resist side forces introduced by the sideways earth-moving operation of discs 224.

In alternative control arrangements for reversing the discs 224, the legs 236 carry star wheels at their upper ends and these engage with either a drive chain or with a displaceable rack to provide a rack and pinion system.

It will be appreciated that the values of dimensions and inclinations quoted above in connection with the illustrated embodiment are given by way of example only as typical or preferable for the items concerned. However if desired other values may be used without in any way departing from the scope of the present invention.

It will also be appreciated that, where appropriate, many of the illustrated items are interchangeable as between embodiments. Some examples have already been given in the text. Others will readily occur to those skilled in the art. For example, the mouldboard-shaped scapers of FIGS. 5a to 5c could be replaced by the flat plate scapers of FIGS. 1a to 1c and vice versa. The scope of the present invention is to be interpreted as including these variations.

The term "concavity" as applied to the dished soil-inversion discs means the perpendicular distance of the centre point of the disc concerned from an imaginary plane containing the circular peripheral edge of the disc.

We claim:

1. A cultivator having an array of laterally-spaced soil-inverting units, each soil-inverting unit comprising a plough-type body having a plowshare and a mouldboard to begin inversion of laterally spaced strips of soil, a respective concave ground-driven soil-inversion disc spaced laterally and rearwardly from each said mouldboards working at a similar depth to the plough-type body and inclined to vertical and when viewed in plan, also to a longitudinal plane of each unit so as, in operation, to lift both deposited soil partially inverted by the plough-type body and the unmoved strip of soil beneath the deposited soil, and respective generally planar deflector means following the disc and arranged to complete the soil-inversion process across the entire width of soil defined by said array of units.

2. A cultivator as claimed in claim 1 in which the dics has a plain edge.

3. A cultivator as claimed in claim 1 in which the disc is from 560 mm to 900 mm in diameter and in which the concavity of the discs in the range of 60 mm to 120 mm.

4. A cultivator as claimed in claim 1 in which the concavity of the discs is in the range from 60 mm to 120 mm.

5. A cultivator as claimed in claim 1 in which a flat scraper is mounted on the disc with a side edge shaped to fit the concavity of the disc.

6. A cultivator as claimed in claim 5 in which a cross-section of the scraper taken in a vertical plane at right angles to the longitudinal mid-plane of the cultivator is inclined at from 20° to 25° to a vertical line in that plane and wherein an edge portion of the scraper is contained at least close to a vertical plane lying parallel to the mid-plane of the cultivator.

7. A cultivator as claimed in claim 1 in which the deflector means is mounted on the disc comprises a flat deflector plate mounted with an edge shaped to fit a plane which contains the circumference of the disc and a plane substantially tangential to the plane of an adjacent border region of the disc.

8. A cultivator as claimed in claim 7 in which the flat deflector plate is from 300 mm to 400 mm long and from 300 mm to 600 mm high.

9. A cultivator as claimed in claim 1 including a support bracket which protrudes forward for 380 from an edge of the disc.

10. A cultivator as claimed in claim 1 in which a tip of a share is 600 mm in front of an edge of the disc.

11. A cultivator as claimed in claim 1 in which the plough-type body comprises a leading share of a width of from 140 to 300 mm with an entry angle of 30° and raked backwards at 40°.

12. A cultivator as claimed in claim 11 in which the share is fitted with a landslide of from 300 mm to 460 mm length with the mouldboard bolted to the top of the share to turn the soil over and sideways towards the next unit.

13. A cultivator as claimed in claim 1 in which the plough-type body comprises a landslide and a shaped, backward raked blade, protruding out at about 90° away from a back portion of the landslide move soil not moved by the adjoining disc.

14. A cultivator as claimed in claim 1 in which the plough-type body is an integral part of a rear disc support leg.

15. A cultivator as claimed in claim 1 including a sidewardly-extending knife operative to ensure that no part of the soil is left uncultivated even in adverse soil conditions.

* * * * *